Nov. 13, 1928.

G. CRISSON 1,691,150

ELECTRICAL POWER LIMITING DEVICE

Filed May 2, 1925

INVENTOR
G. Crisson
BY
ATTORNEY

Patented Nov. 13, 1928.

1,691,150

UNITED STATES PATENT OFFICE.

GEORGE CRISSON, OF EAST ORANGE, NEW JERSEY, ASSIGNOR TO AMERICAN TELEPHONE AND TELEGRAPH COMPANY, A CORPORATION OF NEW YORK.

ELECTRICAL POWER-LIMITING DEVICE.

Application filed May 2, 1925. Serial No. 27,563.

This invention relates to means for limiting and controlling the power transmitted over an electrical circuit, and more particularly to vacuum tube power limiting and controlling devices.

It is the object of applicant's invention to provide improved means whereby the power delivered over transmission circuits may be limited to any desired value. Numerous advantages of the invention will appear in the following description.

Applicant associates with the source of power and the transmission circuit a power-limiting system comprising three-electrode vacuum tubes and an adjustable direct current source, as will be more fully explained below.

Figure 1:
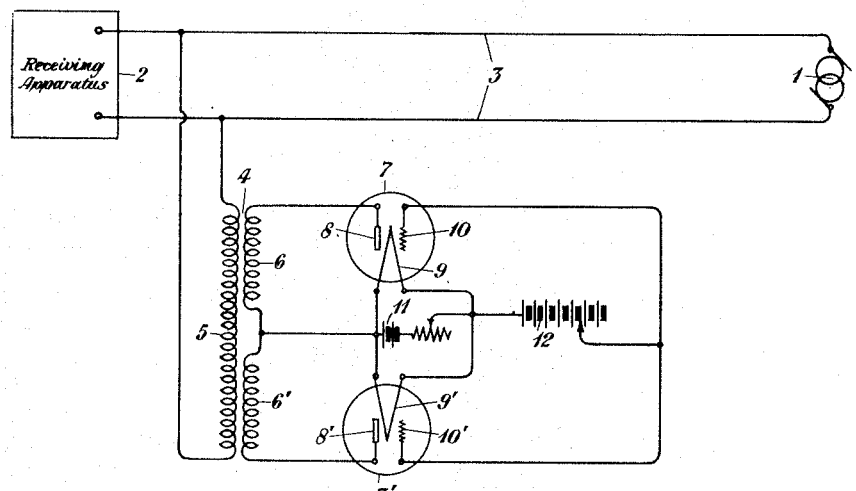
Figure 2:
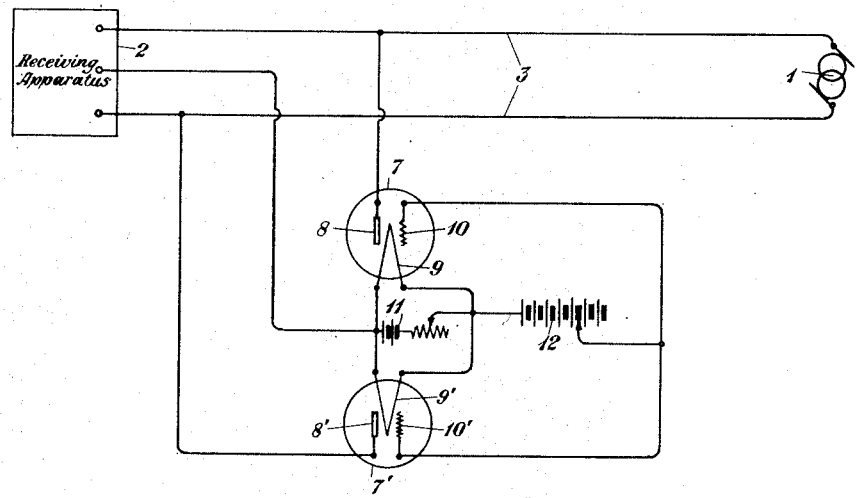

The following detailed description of the invention embodied in two desirable arrangements should be read with reference to the accompanyiny drawing. Figure 1 of the drawing shows diagrammatically an arrangement which may be used with any transmission circuit, and Fig. 2 shows a modification which may be used under certain conditions of the transmission circuit.

With reference to the details of Fig. 1, an alternating current source 1 is connected to receiving apparatus 2 by a transmission line 3. A transformer 4 comprises a primary winding 5 and a secondary winding divided into two parts, 6 and 6'. The primary winding 5 is bridged across the transmission line 3. A duplex vacuum tube arrangement comprises the tubes 7 and 7', having plates 8 and 8', filaments 9 and 9' and grids 10 and 10', respectively. The two parts of the transformer secondary winding, 6 and 6', are connected as shown to the plates 8 and 8' of the tubes 7 and 7', respectively. The filaments 9 and 9' of the tubes are connected to the midpoint of the transformer secondary winding. The battery 11 is the source of current for the filaments. The grids 10 and 10' of the tubes are connected to each other and are given any desired potential with respect to the filaments by means of the adjustable battery 12, connected as shown. It is understood, of course, that the control of the grid potentials may be effected in any desired manner. The drawing indicates control by means of a switch which selects the desired number of cells of the battery.

Let it be assumed that the battery 12 is adjusted so as to impress upon the grids a certain negative potential $E_g$, and let the voltage amplifying factor of the vacuum tubes be represented by $\mu$. It is well understood that the plates 8 and 8' must have a positive potential of at least $\mu E_g$ volts with respect to the filaments before current can flow between the plates and filaments. Hence it will readily be understood that, given the adjustment of the battery 12 indicated above, as long as the voltage of the current source 1 remains below a certain value—the value necessary to produce on the plates potentials in excess of the value $\mu E_g$, the apparatus bridged across the transmission line 3 will have no effect, other than to draw from the line a small exciting current.

When, however, the voltage of the alternating current source 1 exceeds the value indicated above and causes the potentials of the plates to exceed the value $\mu E_g$, current will flow in the system during the peak periods of each half cycle, and these currents will increase rapidly as the voltage applied to the transformer 4 increases. Such currents cause a drop in the source 1 and the line 3, and consequently reduce the peak voltage reaching the receiving apparatus 2. In other words, the apparatus bridged across the line 3 now acts in effect as a shunt path for the line and serves to limit the power delivered over the transmission circuit to the predetermined value.

The shunting action of the power-limiting system can be caused to occur at any desired value of the alternating voltage on the line 3 by an adjustment of the voltage of the battery 12. In the extreme case, the battery 12 may be adjusted to impress zero voltage or a positive voltage on the grids, and the power-limiting device will act as a short-circuiting switch, the shunt being effective for all values of voltage in the line. It is of course, understood that if the power to be limited is large, the vacuum tubes must be capable of dissipating the power to be absorbed without overheating.

The arrangement shown in Fig. 2 is applied to a transmission circuit in which the receiving device 2 possesses a neutral terminal and the impedance is such as to permit direct connection to the vacuum tubes. In this case, the transformer of Fig. 1 is omitted, and the limiting apparatus is directly connected in shunt with the transmission line 3. This direct connection may be employed whenever there is a neutral point available anywhere in the system and the impedances are such as to permit such connection.

It will be obvious that the principles herein described may be embodied in other forms different from those described above without departing from the spirit of the invention as defined in the following claims.

What is claimed is:

1. A device for limiting the electrical power delivered over a circuit including a source of power and a transmission line, said device consisting of a duplex three-electrode vacuum tube arrangement connected effectively in shunt with the transmission line, and means for controlling the potential applied to the grid electrodes of the tubes, the plate electrodes of the tubes being electrically connected one to each side of the transmission line, and the filament electrodes of the tubes being connected to a neutral point in the circuit.

2. A device for limiting the electrical power delivered over a circuit including a source of power and a transmission line, said device comprising a duplex three-electrode vacuum tube arrangement connected effectively in shunt with the transmission line, the plate electrodes of the tubes being electrically connected one to each side of the transmission line and the filament electrodes of the tubes being connected to a neutral point in the circuit, a source of current for the filament electrodes, a source of potential for the grid electrodes, and means for controlling the potential applied to the grid electrodes by said last named source.

3. In combination with a source of electrical power and a transmission circuit, a device for limiting the power delivered over said circuit, said device comprising a duplex vacuum tube arrangement connected effectively in shunt with said circuit, each element of said arrangement having a plate, a filament and a grid, the plates being electrically connected each to one side of the transmission line and the filaments being connected to a neutral point in the circuit, a source of current for said filaments, a source of potential for said grids, and means for adjusting the potential applied to the grids by said last named source.

4. In combination with a source of electrical power and a transmission circuit, means for limiting the power delivered over said circuit, said means including a two-winding transformer having its primary winding bridged across said circuit, a duplex vacuum tube device, each element of said device comprising a filament, a plate and a grid, the filaments of said device being connected to the midpoint of the secondary winding of the transformer, and the plates of said device being connected one to each terminal of said secondary winding, and means for applying any desired potential to the grids of said device.

In testimony whereof, I have signed my name to this specification this 1st day of May, 1925.

GEORGE CRISSON.